(12) United States Patent
Meruva et al.

(10) Patent No.: US 11,335,176 B2
(45) Date of Patent: May 17, 2022

(54) GENERATING A MODEL FOR A CONTROL PANEL OF A FIRE CONTROL SYSTEM

(71) Applicant: Honeywell International Inc., Morris Plains, NJ (US)

(72) Inventors: Jayaprakash Meruva, Bangalore (IN); Rajesh Babu Nalukurthy, Bangalore (IN); Murali Bhandari, Bangalore (IN); Shivanu Bhateja, Bangalore (IN); Vipindas E K, Kannur (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/945,116

(22) Filed: Jul. 31, 2020

(65) Prior Publication Data

US 2022/0036709 A1 Feb. 3, 2022

(51) Int. Cl.
*A62C 37/36* (2006.01)
*G08B 17/00* (2006.01)
*G06F 16/9035* (2019.01)
*G08B 21/10* (2006.01)

(52) U.S. Cl.
CPC ......... *G08B 17/00* (2013.01); *G06F 16/9035* (2019.01); *G08B 21/10* (2013.01)

(58) Field of Classification Search
CPC ........ G08B 17/00; G08B 21/10; G08B 29/04; G08B 3/10; G06F 16/9035; G06F 3/0412; H04L 63/02; H04N 7/186; H04N 7/188
See application file for complete search history.

(56) References Cited

U.S. PATENT DOCUMENTS

| | | | |
|---|---|---|---|
| 7,649,450 B2 | 1/2010 | Campion, Jr. et al. | |
| 8,456,278 B1* | 6/2013 | Bergman | G08B 25/007 340/5.8 |
| 10,679,491 B1* | 6/2020 | Nalukurthy | G08B 17/00 |
| 2002/0016639 A1* | 2/2002 | Smith | G05B 15/02 700/9 |
| 2003/0067889 A1* | 4/2003 | Petite | G08B 21/18 370/310 |
| 2006/0242180 A1 | 10/2006 | Graf et al. | |

(Continued)

FOREIGN PATENT DOCUMENTS

WO 2019079862 A1 5/2019

OTHER PUBLICATIONS

Extended European Search Report for related EP Application No. 21188333.5, dated Jan. 5, 2022 (8 pgs).

*Primary Examiner* — An T Nguyen
(74) *Attorney, Agent, or Firm* — Brooks, Cameron & Huebsch, PLLC

(57) ABSTRACT

Methods, devices, and systems for generating a model for a control panel of a fire control system are described herein. One computing device includes a memory and a processor configured to execute executable instructions stored in the memory to: receive a test string from a control panel of a fire control system, the text string comprising a number of values; receive a number of locations from a user, wherein each location of the number of locations is a location within the text string of a value of the number of values corresponding to a variable of a number of variables; generate a model for the control panel based on the number of locations and the number of variables; and store the model in the memory.

20 Claims, 11 Drawing Sheets

(56) References Cited

U.S. PATENT DOCUMENTS

| | | | |
|---|---|---|---|
| 2012/0027010 A1 | 2/2012 | Elliot et al. | |
| 2012/0260184 A1* | 10/2012 | Dawes | G08B 25/14 |
| | | | 715/736 |
| 2015/0348399 A1 | 12/2015 | Cree et al. | |
| 2016/0078751 A1* | 3/2016 | Sloo | H05B 45/10 |
| | | | 340/506 |
| 2017/0289317 A1* | 10/2017 | Seemann | H04L 12/12 |
| 2018/0122221 A1* | 5/2018 | Norton | G08B 29/043 |
| 2018/0174432 A1 | 6/2018 | Pettigrew et al. | |
| 2018/0191742 A1* | 7/2018 | Dawes | H04L 63/02 |
| 2018/0197387 A1* | 7/2018 | Dawes | H04L 63/02 |
| 2018/0338120 A1* | 11/2018 | Lemberger | G06K 9/00718 |
| 2020/0376310 A1* | 12/2020 | Meruva | G08B 17/00 |

* cited by examiner

GENERATING A MODEL FOR A CONTROL PANEL OF A FIRE CONTROL SYSTEM

TECHNICAL FIELD

The present disclosure relates to methods, devices, and systems for generating a model for a control panel of a fire control system.

BACKGROUND

A fire control system can be comprised of several different components, including fire control panels, gateways, and a fire control cloud service. Large facilities (e.g., buildings), such as commercial facilities, office buildings, hospitals, and the like, may have fire control systems that can be used to prevent a fire from occurring in a facility, and/or to detect and/or manage a fire occurring in the facility. A fire control system may include a number of components located throughout the facility (e.g., on different floors of the facility). For example, a fire control system may include sensors (e.g., smoke detectors) that can sense a fire occurring in the facility, alarms that can provide a notification of the fire to the occupants of the facility, fans and/or dampers that can perform smoke control operations (e.g., pressurizing, purging, exhausting, etc.) during the fire, and/or sprinklers that can provide water to extinguish the fire, among other components. A fire control system may also include a physical fire control panel (e.g., box) installed in the facility that can be used by a user to directly control the operation of the components of the fire control system.

A gateway device may be used by a user (e.g., maintenance technician or operator) to perform inspections, maintenance, and/or upgrades, among other operations, on a fire control system (e.g., on the components of the fire control system) of a facility. For instance, the user may connect the gateway device to the fire control panel of the fire control system, and the gateway device can use a communication protocol to communicate with the fire control panel to perform the tasks of the operation.

DETAILED DESCRIPTION

Figure 1:
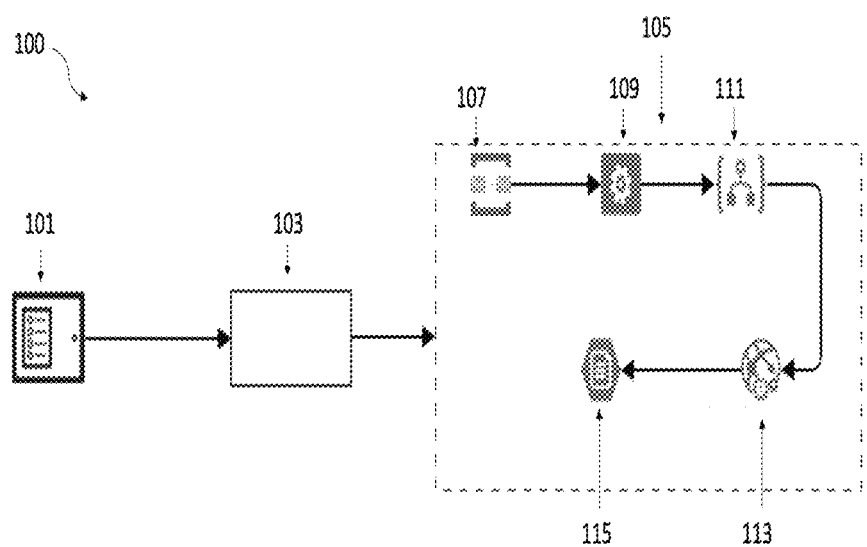
FIG. 1 illustrates a fire control system in accordance with one or more embodiments of the present disclosure.

Methods, devices, and systems for generating a model for a control panel of a fire control system are described herein. For example, in some instances, it may be desirable to incorporate a third-party fire control panel into a fire control system. In other words, a user may desire to employ a fire control panel of a different brand than the other components of the fire control system.

However, a third-party fire control panel may output an event in a text format that is incompatible with the cloud data structure of the fire control system. Therefore, converting the event text into the cloud data structure is necessary for integration. There is a need for fire control systems with the capability of converting event text from a third-party control panel into the fire control system's cloud data structure without changing the base code of the fire control system. This capability would allow new brands of fire control panels to be added into the system rapidly and dynamically.

Many current approaches to integrating fire control panels of one brand into fire control systems of another brand may require knowledge protocol specifications of the fire control panel. However, the protocol specifications of the fire control panel may not be shared by the manufacturer. Furthermore, such methods can be both time and resource intensive.

Other current approaches may involve using a port of the fire control panel to communicate events and alarms to a gateway of the fire control system and from the gateway to a cloud of the fire control system. However, in such approaches, the data received from the fire control panel is formatted as a text string. This text string must be parsed and converted into a data structure that is compatible with the fire control system. Methods, systems, and devices capable of doing so without changing the base code of the fire control system are needed to facilitate the rapid addition of new brands of fire control panels to a fire control system.

Embodiments of the present disclosure may facilitate the introduction of third-party fire control panel brands into fire control systems by generating model information for new third-party fire control brands based on user input and event text from the third-party fire control panel of a given brand. Once the model is created for a given brand, a fire control panel of that brand may be easily integrated into the fire control system. The cloud engine of the fire control system can then translate event text from the fire control panel to the cloud's data structure. Accordingly, embodiments of the present disclosure will improve versatility, efficiency, and overall productivity of fire control systems.

In some examples, one or more embodiments include a computing device for generating a model for a control panel of a fire control system, comprising a processor and a memory having instructions stored thereon which, when executed by the processor, cause the processor to receive a text string from a control panel of a fire control system, the text string comprising a first number of values; receive a number of locations from a user, wherein each location of the number of locations is a location within the text string of a value of the first number of values corresponding to a variable of a number of variables; generate a model for the control panel based on the number of locations and the number of variables; and store the model in the memory.

In some examples, one or more embodiments may include a method of generating a model for a control panel of a fire control system, comprising: receiving a first text string from a control panel of a fire control system, the first text string comprising a first number of values; receiving a first number of locations from a user, wherein each location of the first number of locations is a location within the first text string of a value of the first number of values corresponding to a variable of a number of variables; generating a model for the control panel based on the first number of locations and the number of variables; storing the model; receiving a second text string from the first control panel, the second text string comprising a second number of values; using the model to assign each value of the second number of values to a variable of the number of variables; and performing, by one or more components of the fire control system, a number of actions based on one or more values of the second number of values assigned to one or more variables of the number of variables.

In some examples, one or more embodiments may include a fire control system comprising a control panel, a gateway, an application, and one or more components. The gateway may be configured to receive a first text string and a second text string from the control panel, the first text string comprising a first number of values, and the second text string comprising a second number of values. The application may be configured to: carry out iterations of a process, each iteration comprising prompting a user through a user interface to select a value of the first number of values corresponding to a variable of one or more variables and receiving a selection of the value of the first number of values from the user through the user interface; determine a location within the first text string of each selection; generate a model for the control panel based on the location of the value of each selection and the one or more variables; and use the model to assign each value of the second number of values to a variable of the number of variables. The one or more components may be configured to perform a number of actions based on one or more values of the second number of values assigned to one or more variables of the number of variables.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component. Additionally, the designator "N", as used herein particularly with respect to reference numerals in the drawings, indicates that a number of the particular feature so designated can be included with a number of embodiments of the present disclosure. This number may be the same or different between designations.

As described herein, a fire control system may be any system designed to detect and notify of fire events. For example, a fire control system may include sensors (e.g., smoke detectors) that can sense a fire occurring in the facility, alarms (e.g., speakers, strobes, etc.) that can provide a notification of the fire to the occupants of the facility, fans and/or dampers that can perform smoke control operations (e.g., pressurizing, purging, exhausting, etc.) during the fire, and/or sprinklers that can provide water to extinguish the fire, among other components. A fire control system may also include a control unit such as a physical fire control panel (e.g., box) installed in the facility that can be used by a user to directly control the operation of the components of the fire control system. In some embodiments, the fire control system can include a non-physical control unit or a control unit located remotely from the facility.

As used herein, a "computing device" can be, refer to, and/or include a laptop computer, desktop computer, or mobile device, such as, for instance, a smart phone or tablet, among other types of computing devices. However, embodiments of the present disclosure are not limited to a particular type of computing device. A computing device may be located at the facility, such as, for instance, in a control room or operating room of the facility, or may be located remotely from the facility. A computing device can include a memory, and a processor configured to execute executable instructions stored in the memory.

As used herein, a "computing device" can monitor and/or control the components of the fire control system via a wired or wireless network. The network can be a network relationship through which the computing device can communicate with the components of the smoke control system. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, the network can include a number of servers that receive information from, and transmit information to, the computing device and the components of the smoke control system via a wired or wireless network.

As used herein, a "network" can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

FIG. 1 illustrates a fire control system 100 in accordance with one or more embodiments of the present disclosure. As illustrated in FIG. 1, a fire control system 100 may include a fire control panel 101, a gateway 103, and a centralized management platform 105. Centralized management platform 105 can be, for instance, a fire control service platform that is part of a cloud computing environment. For instance, centralized management platform 105 can be and/or include a cloud computing device.

Although not shown in FIG. 1 for simplicity and so as not to obscure embodiments of the present disclosure, fire control system 100 can include a plurality of components located throughout a facility (e.g., on different floors of the facility) that can be used to detect and/or manage a fire occurring in the facility, and/or to prevent a fire from occurring in the facility. For example, components may include sensors (e.g., smoke detectors) that can sense a fire occurring in the facility, alarms that can provide a notification of the fire to the occupants of the facility, fans and/or dampers that can perform smoke control operations (e.g., pressurizing, purging, exhausting, etc.) during the fire, and/or sprinklers that can provide water to extinguish the fire, among other components.

As shown in FIG. 1, fire control system 100 can include a control panel (e.g., fire control panel) 101. Control panel 101 can be any different type (e.g., brand) of fire control panel. For instance, control panel 101 can be any different type of physical control panel, such as a control box, installed in the facility.

Control panel 101 can be used by a user to monitor and/or control components of the fire control system 100. For instance, the user can use control panel 101 to directly control the operation of (e.g., actions performed by) components of the fire control system 100. Further, control panel 101 can receive (e.g., collect) data, such as, for instance, real-time operational data, associated with components of the fire control system 100. For instance, control panel 101 can receive the data directly from the components. Such data can include, for instance, current operational statuses, operational states, and/or properties of the components.

Gateway device 103 can be used by a user (e.g., maintenance technician or operator) to perform inspections, maintenance, and/or upgrades, among other operations, on the components. Gateway device 103 can be connected to control panel 101 and can communicate with control panel 101 to receive the data associated with the components of the fire control system 100 collected by control panel 101. For instance, gateway device 103 can detect connectivity to control panel 101, select the communication protocol type associated with control panel 101, and communicate with control panel 101 using the selected communication protocol type. As an additional example, gateway device 103 may be permanently installed and/or connected at the facility, such that it can continuously send (e.g., push) the data collected by control panel 101 to a centralized server for detection of anomalies or other issues in the fire control system of the facility.

The gateway 103 may be configured to receive a text string from the fire control panel 101. In some embodiments, the fire control panel 101 may include a port from which the text string is received. The port may be a parallel port, such as a printer port. The text string may represent an event or condition detected by one or more components of the fire control system 100 and transmitted to fire control panel 101. The fire control panel 101 may then transmit a text string to the gateway 103 based on the event detected. The text string may include information about the event, such as the time and date of the event, the type of event (e.g. fire), address of the component detecting the event, or zone of an area in which the event was detected. For example, a smoke detector of a fire control system 100 may detect a fire condition and transmit a notification of the fire condition to the fire control panel 101. The fire control panel 101 may then transmit a text string to the gateway 103. The text string may include information about the fire condition. For example, the text string may include, but is not limited to, the date and time of the detection of the fire condition, the type of condition, the address of the smoke detector that detected the fire condition, and the zone of an area in which the fire condition was detected.

The gateway 103 may be configured to relay the text string to the platform 105. In other words, the gateway 103 may act as a node between the fire control panel 101 and the platform 105. In some embodiments, the fire control panel 101 may be of a different brand than other components of the fire control system 100. For example, the fire control panel may be of a different brand than the gateway 103 and the platform 105. Thus, there may be a need to convert the text string received from the fire control panel 101 to a data structure compatible with the platform 105 data structure.

The platform 105 may include an events and alarms notification center 107. A user may connect to the platform 105 and view all text strings received from the fire control panel 101 in the notification center 107, as will be described in more detail in connection with FIG. 3. The platform 105 may also include a fire event application 109.

Text strings received from the fire control panel 101 may be transmitted from the notification center 107 of the platform 105 to a lexical analyzer 111. The lexical analyzer 111 may read the characters of the text string. The lexical analyzer 111 may then convert the characters of the text string into a sequence of tokens. For example, the lexical analyzer 111 may remove any white space in the text string and separate each token from other tokens in the string. A token may be, for example, a keyword, an identifier, a constant, a string, or an operator. The lexical analyzer 111 may also index the text string such that each character of the text string is assigned an integer value, starting at 0. The output of the lexical analyzer 111 may then be transmitted to a user interface 113.

As will be described in greater detail herein, a model may then be generated for the control panel 101 of the fire control system 100. The platform 105 may include an application. The application may include, for example, the user interface 113 and the model template 115. The application may be configured to carry out iterations of a process. This process may include prompting a user through the user interface 113 to select a value of the to select a portion of a text string corresponding to the appropriate value for a variable of a number of variables. In other words, if a first text string including a first number of values is transmitted from the gateway 103 to the platform 105, the user may be prompted through the user interface 113 to select a value of the first number of values corresponding to a variable of one or more variables. The user interface 113 may receive a selection of the value of the first number of values from the user through the user interface 113.

This process may be repeated in iterations until a value has been assigned to each variable of the number of variables. With each iteration, the application may determine a location within the text string of the value of each selection. In other words, the location of the value may be recorded and saved for the model generation. For example, one iteration of the process may include prompting a user to select a portion of the text string including a value corresponding to the date of the relevant event. The user may then select the relevant portion, and the value of the relevant portion may be assigned to a date variable. The location within the string of the portion corresponding to the event date may be recorded to be implemented into a model for the fire control panel 101.

After a location is recorded for each variable of the number of variables, the locations may be transmitted to a model template 115. The model template may generate a model for the fire control panel 101 based on the location of the value of each selection received through the user interface 113 and the one or more variables. In some embodiments, the location of the value of each selection may be described through indices. For example, a value may begin at index 1 of the string and end at index 5. The location of the value of each selection may also be described through an identification of the row of the first text string on which the value may be found. In some embodiments, this model may then be stored in the platform 105.

Once the model is generated, the gateway 103 may receive a second text string from the fire control panel 101 or another fire control panel within the system of the same brand as fire control panel 101. The second text string may include a second number of values. While the first text string may represent a first event or condition detected by a component of the fire control system 100, the second text string may represent a second event or condition detected by a component of the fire control system 100. The application may use the model to assign each value of the second number of values to a variable of a number of variables.

Although not illustrated in FIG. 1 for simplicity and so as not to obscure embodiments of the present disclosure, the fire control system 100 may also include one or more components configured to perform a number of actions based on one or more values of the second number of values assigned to one or more variables of the number of variables. For example, if the value for a "Fire Condition" variable is "True" for an area covered by the fire control system, then one or more components of the fire control system 100 may be configured to activate a fire alarm. In another example, if the one or more values include an indication of a fault condition within the system, one or more components of the fire control system 100 may be configured to notify a user.

Although FIG. 1 illustrates a fire control system 100 with only one fire control panel 101, embodiments of the present disclosure are not so limited. For example, in some embodiments, the fire control system 100 may include multiple fire control panels. In some embodiments, each of the fire control panels may be of the same brand. In other embodiments, the fire control panels may be of different brands. A different model may need to be generated for each brand of a fire control panel 101-N. In some embodiments, the gateway 103 may be configured to receive a text string from an additional control panel of the fire control system different from the fire control panel 101. If the additional control panel is of a different brand than the fire control panel 101, the text string from the additional control panel may be formatted differently than the text strings from control panel 101 and may require the generation of a unique model. The application may then carry out the same process used to generate a model for fire control panel 101. Each model may be stored in the platform 105. When a user integrates a new fire control panel 101 into the system 100 and a model has already been generated for a fire control panel of that brand, they could select the model for that brand to be used to convert text from the new fire control panel. In some embodiments, the user interface 113 may be configured to prompt the user to select a model from a number of generated models. The application may be configured to use the selected model to control the control panel 101.

Figure 2:
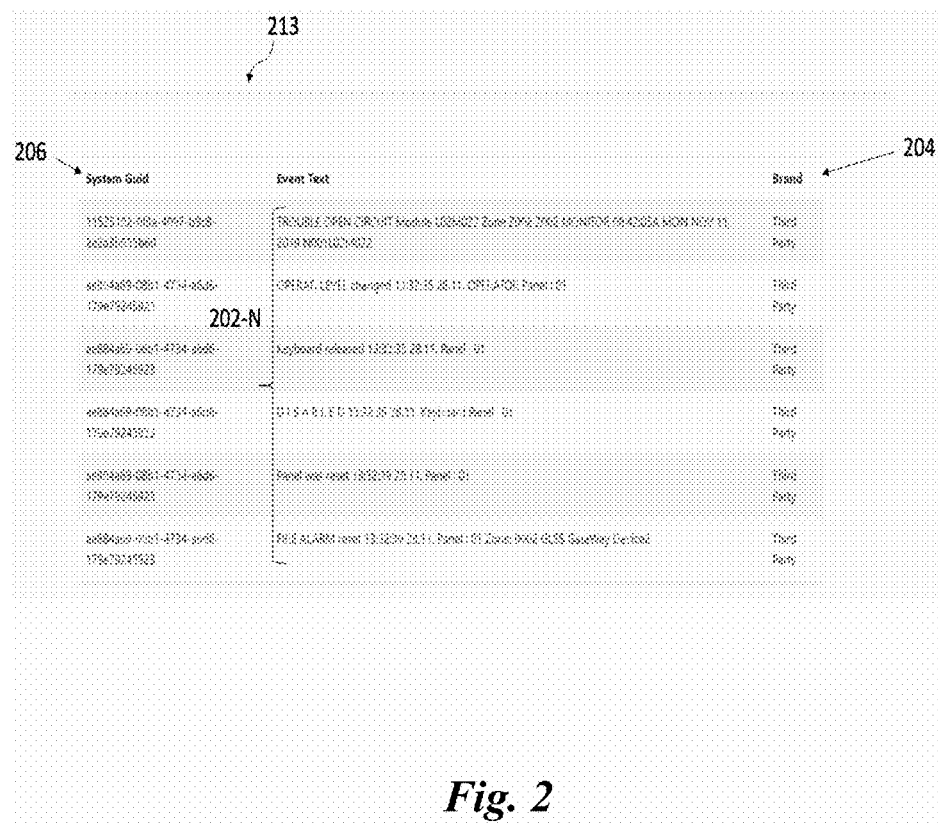
FIG. 2 is a view of a display of a user interface in accordance with one or more embodiments of the present disclosure.

FIG. 2 is a view of a display (e.g., a screenshot) of a user interface 213 in accordance with one or more embodiments of the present disclosure. User interface 213 can be, for instance, user interface 113 previously described in connection with FIG. 1.

As illustrated in FIG. 2, the display may list one or more text strings 202-N transmitted from the fire control panel 101 of FIG. 1 and transmitted to the platform 105 through the gateway 103. The display 213 may also include a brand column 204 listing the brand of the fire control panel from which each text string 202-N was received from. The display may also include a control panel identifier column 206 listing an identifier of the fire control panel 101-N from which each text string 202-N was received from.

As shown in FIG. 2, each text string 202-N may represent the detection of an event or condition within the fire control system 100. An event may be any action performed by a user on a component of the fire control system 100 or any action performed by a component of the fire control system 100. An event may include, for example, an action performed on a fire control panel 101. For instance, as shown in FIG. 2, such an event may include, but is not limited to, the clearing of a fault, the resetting of a fire alarm, the resetting of a fire control panel 101, the disabling of a fire control panel 101, the release of a keyboard from the fire control panel 101, or a change in the operation level of a fire control panel 101. A condition may include, for example, a fault detected within the fire control system 100 by one or more components of the fire control system 100. In other words, a condition may include the detection of improper operation of one or more components of the fire control system 100, such as a circuitry fault.

A text string 202-N may include other information pertaining to the event or condition which it describes. For example, a text string 202-N may include, but is not limited to: a date of the event occurred, a time of the event or condition, a zone within the fire control system 100 in which the event or condition occurred, an address or identifier for the fire control panel 101 transmitting the text string 202-N to the gateway 103, or an address or identifier for a component of the fire control system 100 that originally detected the event or condition and transmitted notification of that event or condition to the fire control panel 101.

Figure 3:
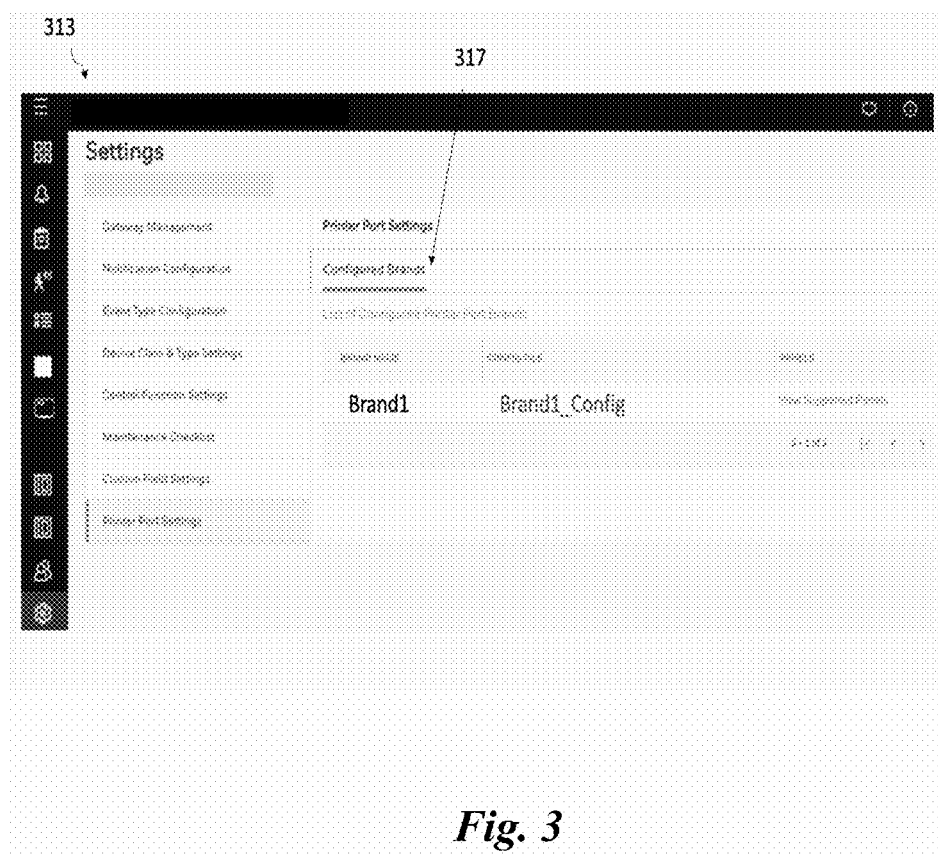
FIG. 3 is another view of a display of a user interface in accordance with one or more embodiments of the present disclosure.

FIG. 3 is another view of a display (e.g., screen shot) of user interface 313 in accordance with one or more embodiments of the present disclosure. User interface 313 can be, for instance, user interface 113 previously described in connection with FIG. 1.

As illustrated in FIG. 3, a file for a model for a fire control panel 101 that has previously been generated may be uploaded to the application or to the platform 105. If a model for a fire control panel 101 has already been uploaded as shown in FIG. 3, the brand for the fire control panel 101 will be listed under a configured brands module 317 of the user interface 313.

FIGS. 4A-4E are displays (e.g., screen shots) of user interface 413 illustrating a method of generating a model for a control panel of a fire control system in accordance with one or more embodiments of the present disclosure. User interface 313 can be, for instance, user interface 113 previously described in connection with FIG. 1, and the control panel and fire control system can be, for instance, control panel 101 and fire control system 100, respectively, previously described in connection with FIG. 1.

Figure 4A:
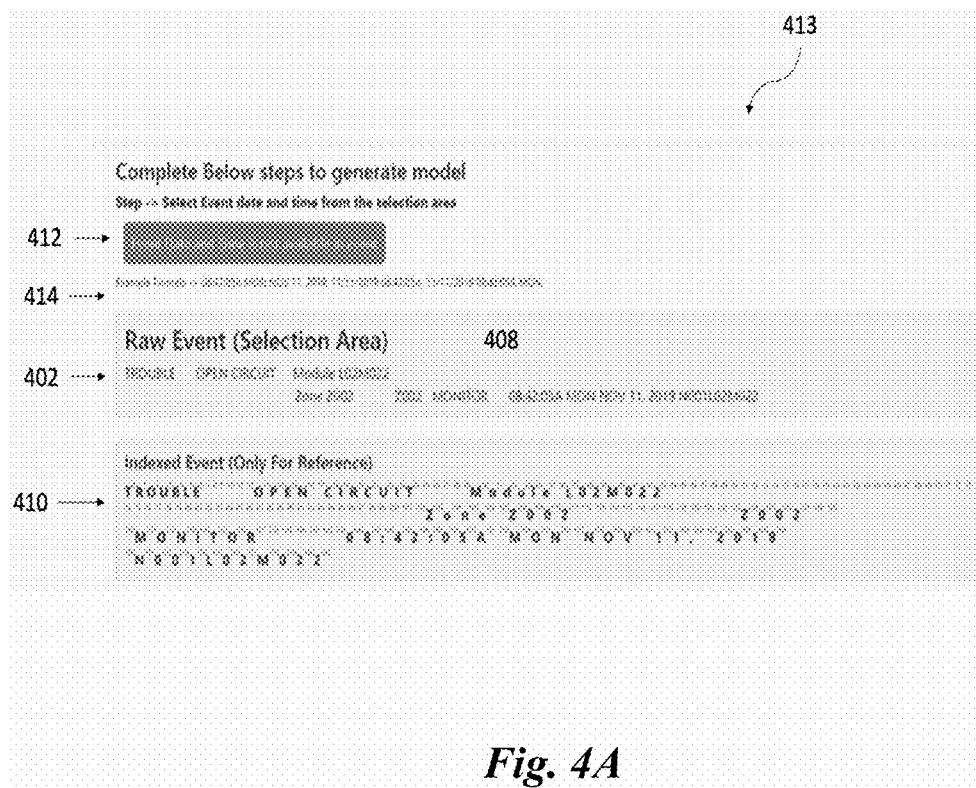
FIG. 4A-4E are displays of a user interface illustrating a method of generating a model for a control panel of a fire control system in accordance with one or more embodiments of the present disclosure.

The display of FIG. 4A illustrates a first step of the method. As shown in FIG. 4A, a text string 402 comprising a number of values 408 may be displayed. The user may be prompted through the user interface 413 to select a value of the number of values 408 corresponding to a variable of a given list of variables. For example, as shown in FIG. 4A, a user may be prompted to select a value 408 from the text string 402 corresponding to the date and/or time of the event. Such a prompt may read, "Select Event date and time from the selection area." The value selected by the user in response to such a prompt would correspond to a date and time variable.

In some embodiments, the display may also show an indexed version 410 of the text string 402. The indexed version 410 may number each character of the text string 402, including spaces, beginning with the number 0.

In some embodiments, the display may include a button 412 configured to receive input from the user indicating that values corresponding to the date and time of the event are not available in the text string 402. If the button 412 is selected, the user interface will then proceed to prompt the user to select a value of the number of values 408-N corresponding to a different variable of a given list of variables.

In some embodiments, the display may also include an example format 414 of the text string 402. Such an example format 414 may include example values for each variable of a given list of variables.

Figure 4B:
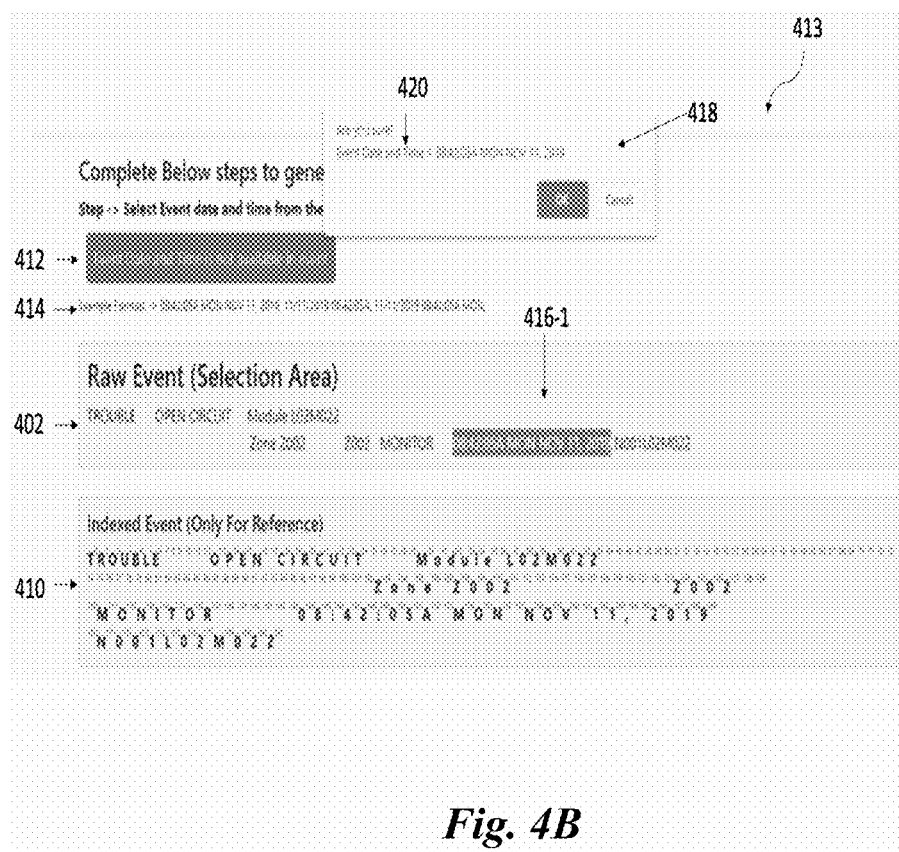

The display of FIG. 4B illustrates another (e.g., subsequent) step of the method. As illustrated in FIG. 4B, the display may be configured to receive from a user a selection 416 of a value corresponding to the variable prompted in the step illustrated in FIG. 4A. The user may make a selection 416 through any suitable means. For example, a user may make a selection 416 by highlighting or clicking on the location of the selection 416 with a mouse or touching the location of the selection 416 on a screen.

In some embodiments, the display may then request verification from the user that the selection they have made is correct. This may be done by displaying a window 418 showing the variable 420 and the text corresponding to the selection 416.

The steps of the method described in connection with FIGS. 4A and 4B may be repeated in iterations such that a selections 416-N are made for each variable of a list of variables.

Figure 4C:
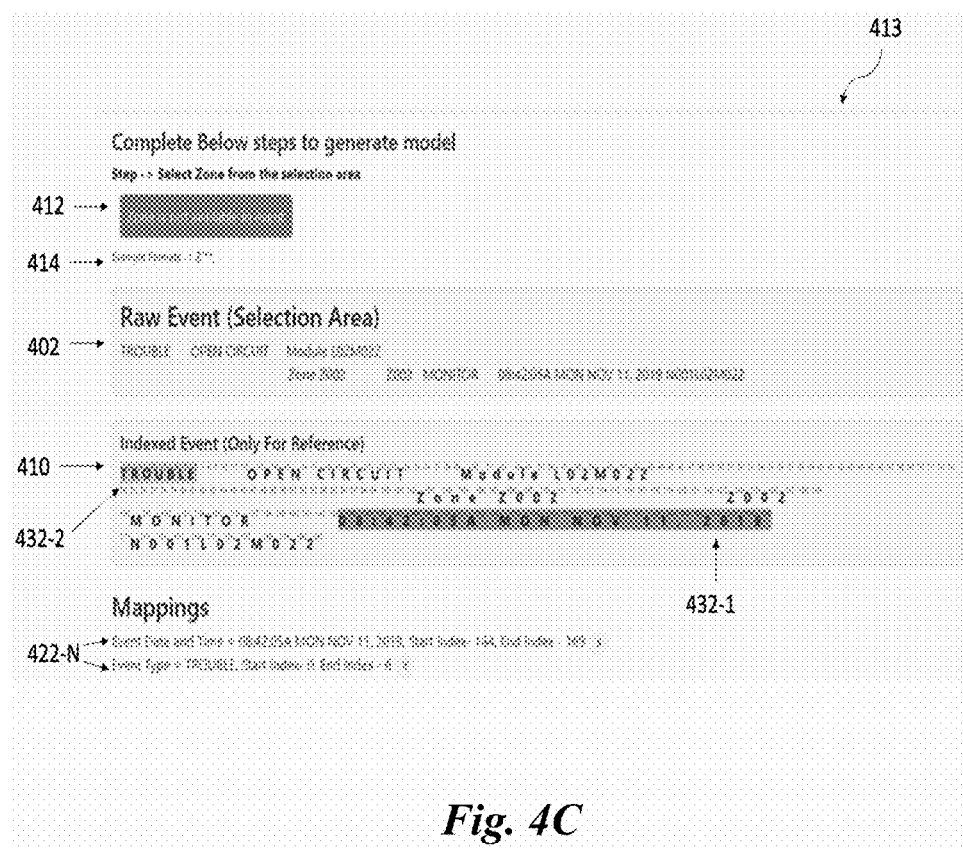

The display of FIG. 4C illustrates another (e.g., subsequent) step of the method. The indexed version 410 of the text string may include highlights 432-N reflecting selections made 416-N during the previously executed steps illustrated in FIG. 4A and FIG. 4B. Furthermore, the user interface 413 may display one or more mappings 422-N. These mappings 422-N may list variables for which a selection 416-N has already been made, along with the value corresponding to that selection 416-N, a start index, and an end index for that selection 416-N. The start index and end index for each selection 416 may comprise a location for each selection 416-N.

A user may be prompted through the user interface 413 to make a selection for a variable (e.g. selection 416-1 in FIG. 4B) for which a selection (e.g. selection 416-1 in FIG. 4B) has not already been made. For example, as shown in FIG. 4C, if selections have already been made for the "Event Type" and "Event Date and Time" variables, the user interface 413 may prompt the user to select a value from the text string 402 corresponding to a "Zone" variable.

Figure 4D:
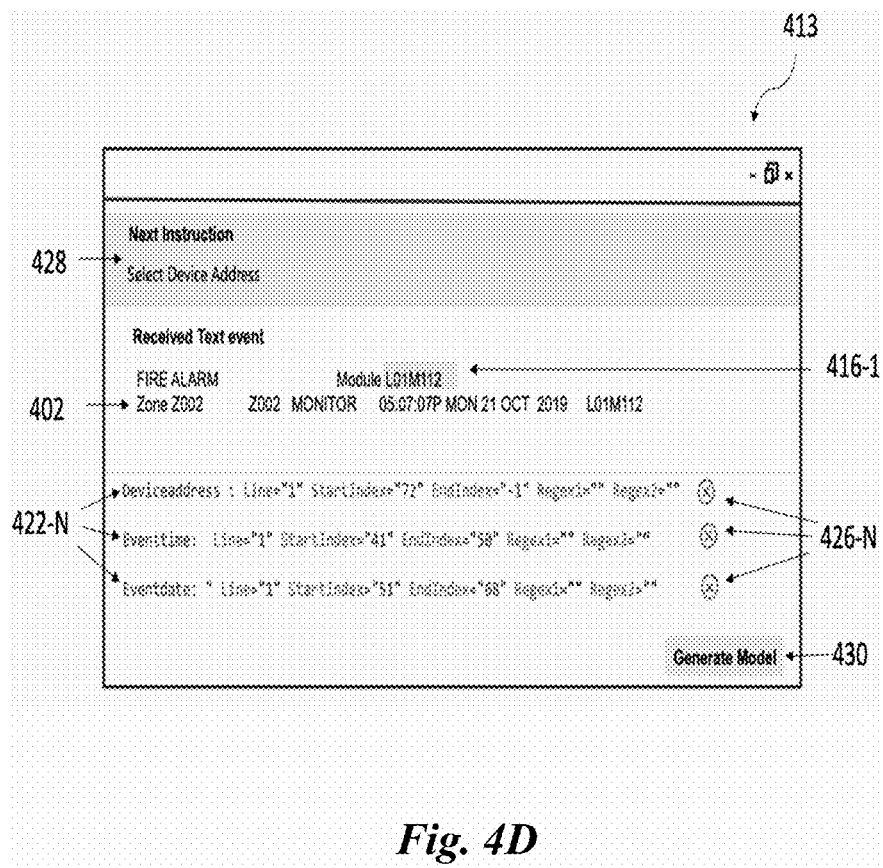

The display of FIG. 4D illustrates an alternative to the step of the method illustrated in FIG. 4C. As illustrated in FIG. 4D, the user interface 413 may display the text string 402. The user interface may also display a number of mappings 422-N, with buttons 426-N providing the option for the user to remove the a given mapping 422-N corresponding to a selection 416-N. After the user makes a selection 416-1, the list of mappings 422-N may be updated to reflect the most recent selections 416-N. An instruction display 428 may also be updated to prompt the user to make a selection corresponding to another variable in a list of variables. The display may also include a button 430 for the user to generate a model for the fire control panel.

Figure 4E:
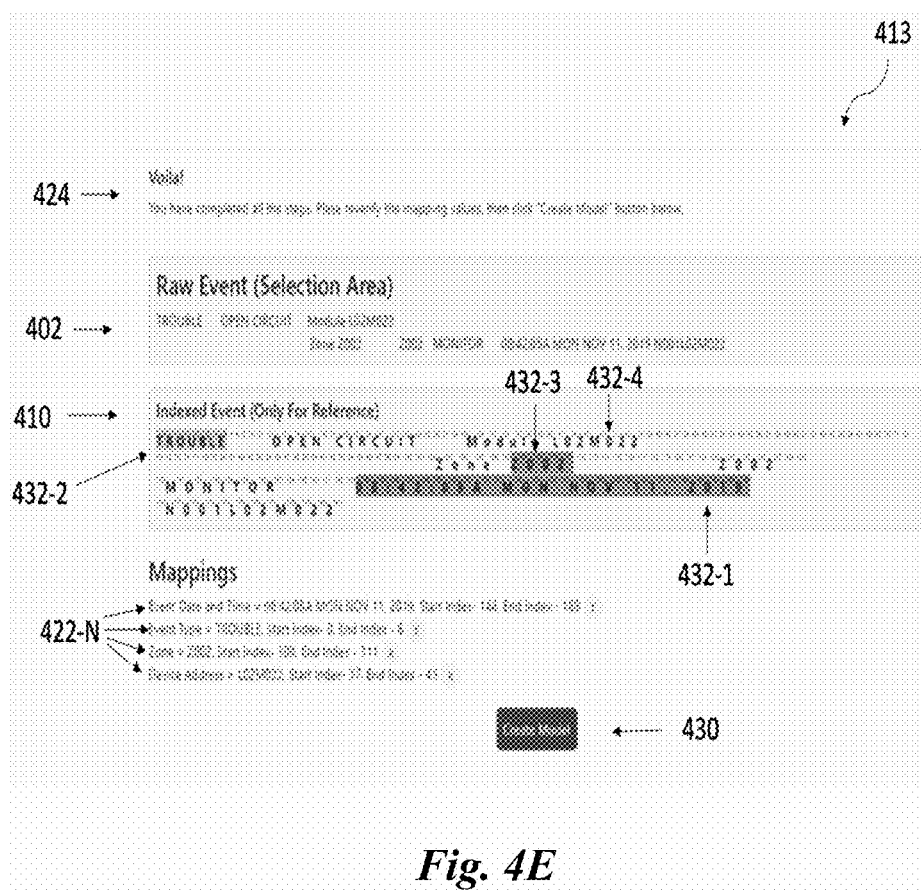

The display of FIG. 4E illustrates another (e.g., subsequent) step of the method. Once each iteration of the process has been completed, the user interface 413 may display an indication 424 that the process is complete. The user interface 413 may also display an indexed version 410 of the text string 402 with the selections 416-N highlighted. The user interface 413 may also display a list of mappings 422-N for each variable. The user interface 413 may prompt the user to review the mappings 422-N and verify that each mapping 422-N displays the correct pairings of selections 416-N and variables. The user interface 413 may also include a button 430 through which the user can prompt model generation.

Figure 5A:
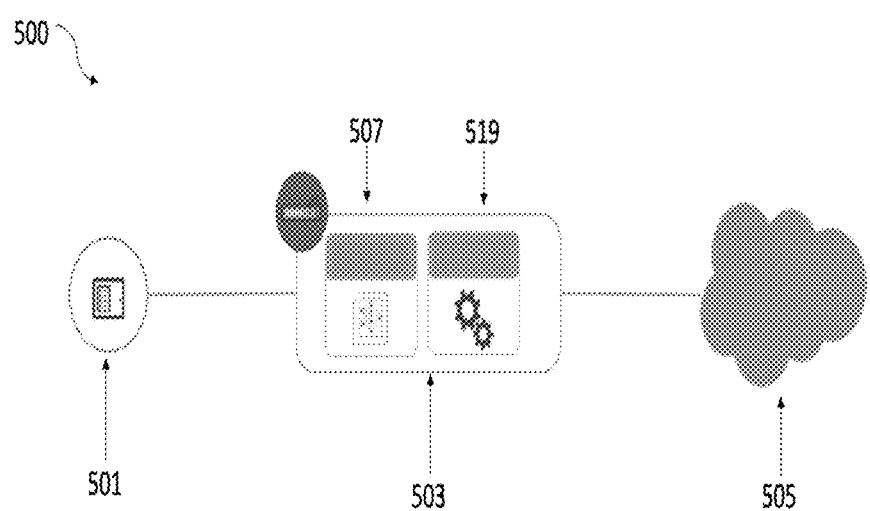
FIGS. 5A-5B illustrate examples of a fire control system for generating a model for a control panel of a fire control system in accordance with one or more embodiments of the present disclosure.

FIG. 5A illustrates an example of a fire control system 500 for generating a model for a control panel 501 of a fire control system 500 in accordance with one or more embodiments of the present disclosure. A gateway 503 may be a router configured to receive a text string from a fire panel 501. The gateway 503 may include an application 519 for generating a model for a fire control panel 501 in accordance with the method described in connection with FIGS. 1-3 and 4A-4E. The gateway 503 may also include a memory 507 configured to store models generated through the application 519, and may be in communication with centralized management platform (e.g., cloud computing device) 505.

Figure 5B:
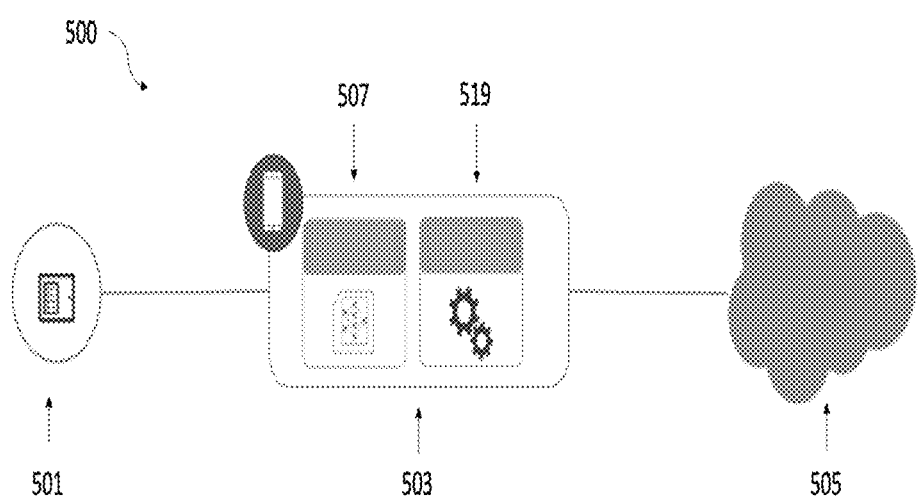

FIG. 5B illustrates another example of a fire control system 500 for generating a model for a fire control panel 501 of the fire control system 500 in accordance with one or more embodiments of the present disclosure. A gateway 503 may be a mobile device configured to receive a text string from a fire panel 501. For example, the gateway 503 may be a mobile phone. The gateway 503 may include an application 519 for generating a model for a fire control panel 501 in accordance with the method described in connection with FIGS. 1-3 and 4A-4E. For example, the application 519 may be a mobile phone application. The gateway 503 may also include a memory 507 configured to store models generated through the application 519, and may be in communication with centralized management platform 505.

Figure 6:
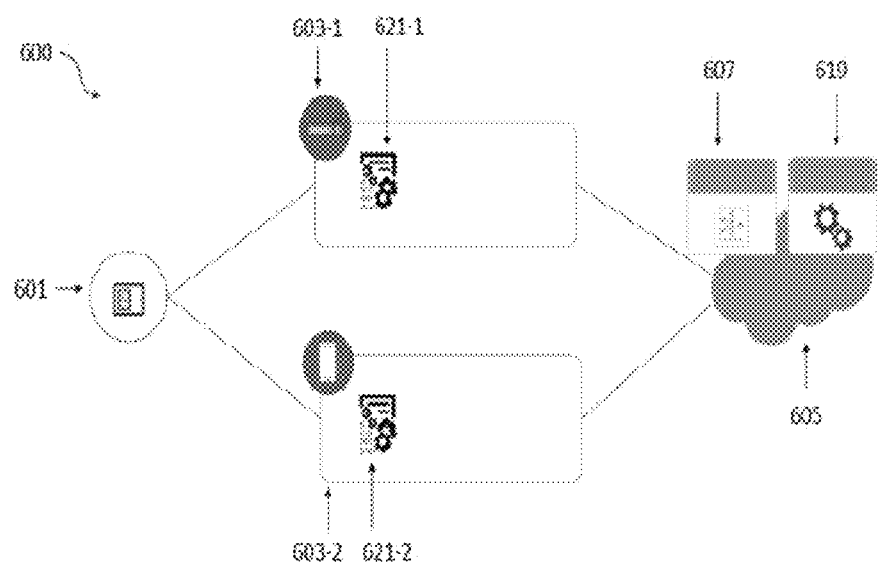
FIG. 6 illustrates another example of a fire control system for generating a model for a control panel of the fire control system in accordance with one or more embodiments of the present disclosure.

FIG. 6 illustrates another example of a fire control system for generating a model for a control panel of the fire control system in accordance with one or more embodiments of the present disclosure. As illustrated in FIG. 6, a fire control panel 601 may transmit a text string in response to an event or condition to a gateway 603-1 and a gateway 603-2. Gateway 603-1 may be, for example, a router. Gateway 603-2 may be, for example, a mobile device, such as a mobile phone. However, embodiments of the present disclosure are not so limited.

Gateways 603-1 and 603-2 may transmit the text string from the fire control panel 601 to the centralized management platform 605. The centralized management platform 605 may include a memory 607 which may store a number of models for fire control panels 601-N. The centralized management platform 605 may also include an application 619 for generating a model for a fire control panel 601 as described in connection with FIGS. 1-3 and 4A-4E. Gateways 603-1 and 603-2 may each include processors 621-1 and 621-2, which may be configured to receive events in the form of text strings from the fire panel 601 and transmit such text strings to the centralized management platform 605.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computing device for generating a model for a control panel of a fire control system, comprising:
   a memory; and
   a processor configured to execute executable instructions stored in the memory to:
      receive a text string from a control panel of a fire control system, the text string comprising a number of values;
      receive a number of locations entered by a user, wherein each location of the number of locations is a location within the text string of a value of the number of values corresponding to a variable of a number of variables;
      generate a model for the control panel based on the number of locations and the number of variables; and
      store the model in the memory.

2. The computing device of claim 1, wherein the processor is configured to execute the instructions to:
   receive an additional text string from the control panel, the additional text string comprising an additional number of values;
   use the model to assign each value of the additional number of values to a variable of the number of variables; and
   cause one or more components of the fire control system to perform a number of actions based on one or more values of the additional number of values assigned to one or more variables of the number of variables.

3. The computing device of claim 1, wherein the computing device is a cloud computing device.

4. The computing device of claim 1, wherein the text string is received from a port of the control panel.

5. The computing device of claim 4, wherein the port is a printer port.

6. The computing device of claim 1, wherein the number of variables includes at least one variable for at least one of the following:
   an address of the control panel;
   a fault type detected by one of more components of the fire control system;
   a date on which the computing device received the text string;
   a time of day at which the computing device received the text string; and
   a fire condition within an area covered by the fire control system.

7. A method of generating a model for a control panel of a fire control system, comprising:
   receiving a first text string from a control panel of a fire control system, the first text string comprising a first number of values;
   receiving a first number of locations from a user, wherein each location of the first number of locations is a location within the first text string of a value of the first number of values corresponding to a variable of a number of variables;
   generating a model for the control panel based on the first number of locations and the number of variables;
   storing the model;
   receiving a second text string from the first control panel, the second text string comprising a second number of values;
   using the model to assign each value of the second number of values to a variable of the number of variables; and
   performing, by one or more components of the fire control system, a number of actions based on one or more values of the second number of values assigned to one or more variables of the number of variables.

8. The method of claim 7, further comprising:
   receiving a third text string from an additional control panel of the fire control system, the third text string comprising a third number of values;
   receiving a second number of locations from the user, wherein each location of the second number of locations is a location within the third text string of a value of the third number of values corresponding to a variable of the number of variables;
   generating an additional model for the additional fire control panel based on the second number of locations and the number of variables; and
   storing the additional model.

9. The method of claim 8, wherein the third text string is formatted differently than the first text string and the second text string.

10. The method of claim 7, wherein the first text string represents a first event detected by a component of the fire control system.

11. The method of claim 7, wherein at least one component of the one or more components comprises a notification device.

12. The method of claim 7, wherein at least one action of the number of actions comprises notifying the user of a fault condition within the fire control system.

13. The method of claim 7, wherein at least one action of the number of actions comprises notifying the user of a fire condition within an area covered by the fire control system.

14. A fire control system comprising:
   a control panel;
   a gateway configured to receive a first text string and a second text string from the control panel, the first text string comprising a first number of values, and the second text string comprising a second number of values;

an application configured to:
- carry out iterations of a process, each iteration comprising prompting a user through a user interface to select a value of the first number of values corresponding to a variable of one or more variables and receiving a selection of the value of the first number of values from the user through the user interface;
- determine a location within the first text string of each selection;
- generate a model for the control panel based on the location of the value of each selection and the one or more variables; and
- use the model to assign each value of the second number of values to a variable of the number of variables; and one or more components configured to perform a number of actions based on one or more values of the second number of values assigned to one or more variables of the number of variables.

15. The system of claim 14, wherein the gateway is configured to receive a third text string from an additional control panel of the fire control system, the third text string comprising a third number of values.

16. The system of claim 15, wherein the application is configured to:
- carry out iterations of an additional process, wherein each iteration comprises prompting the user through the user interface to select a value of the third number of values corresponding to a variable of the one or more variables and receiving a selection of the value of the third number of values from the user through the user interface;
- determine a location within the third text string of the value of each selection; and
- generate a model for the additional control panel based on the location within the third text string of the value of each selection and the one or more variables.

17. The system of claim 15, wherein the gateway is configured to receive a fourth text string from a third control panel, the fourth string comprising a fourth number of values.

18. The system of claim 14, wherein the user interface is configured to prompt the user to select the model from a number of models.

19. The system of claim 18, wherein the application is configured to use the selected model to control the control panel.

20. The system of claim 14, wherein at least one of the number of actions comprises transmitting a notification to the user if one or more values of the second number of values assigned to a variable of the number of variables indicates a fire condition.

* * * * *